W. H. JOY AND H. G. PORTER.
KNOCKDOWN VOTING BOOTH.
APPLICATION FILED JUNE 9, 1921.
1,393,224.
Patented Oct. 11, 1921.
3 SHEETS—SHEET 1.
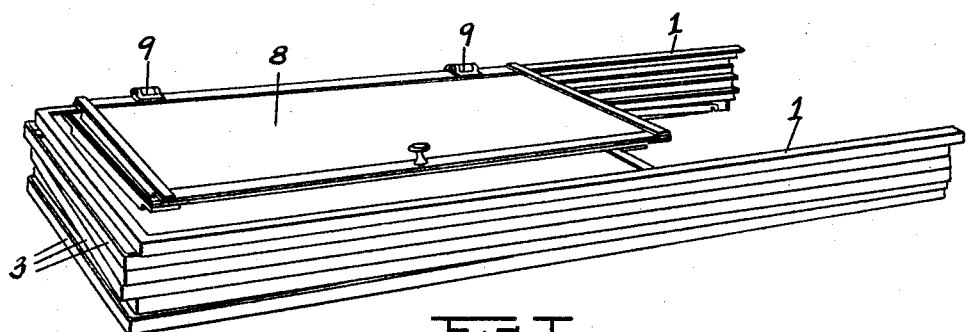
Fig. I.
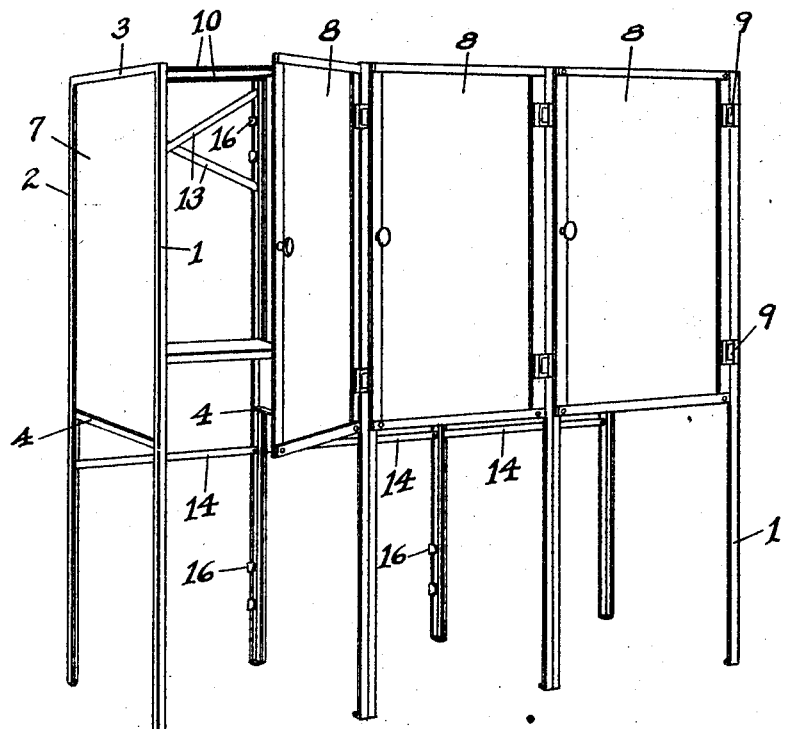
Fig. II.
Inventors
Harry G. Porter
William H. Joy
By Chappell & Earl
Attorneys W. H. JOY AND H. G. PORTER.
KNOCKDOWN VOTING BOOTH.
APPLICATION FILED JUNE 9, 1921.
1,393,224.
Patented Oct. 11, 1921.
3 SHEETS—SHEET 2.
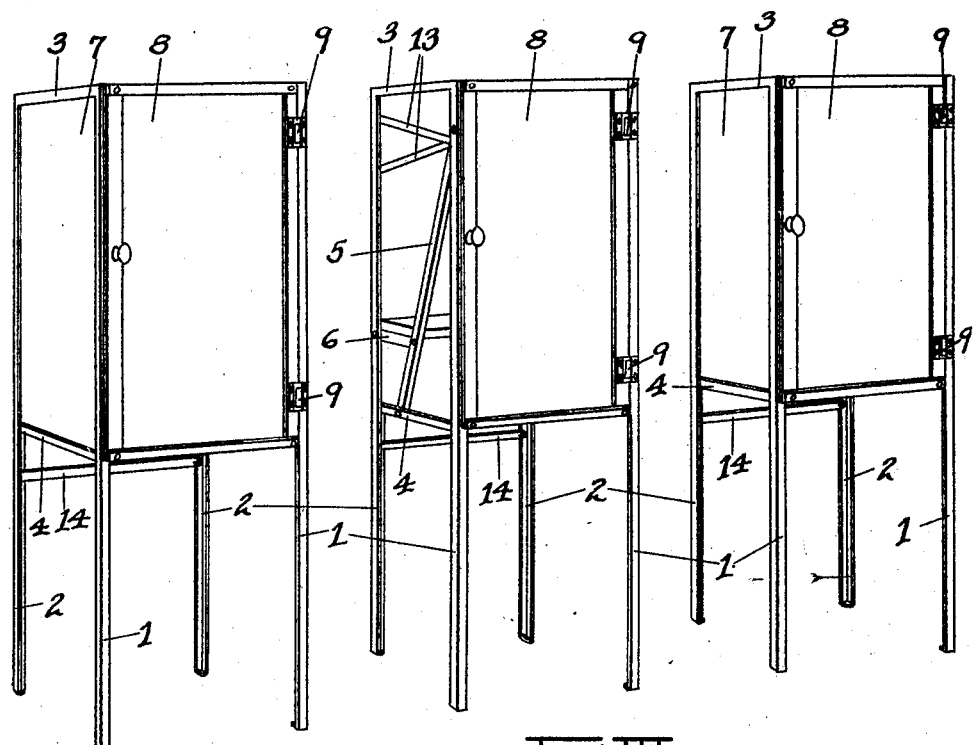
Fig. III.
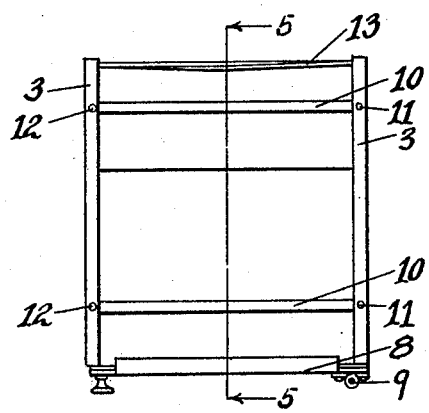
Fig. IV.
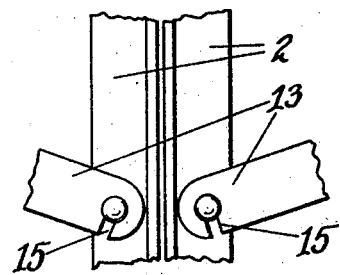
Fig. VIII.
Inventors
Harry G. Porter
William H. Joy
By Chappell & Earl
Attorney

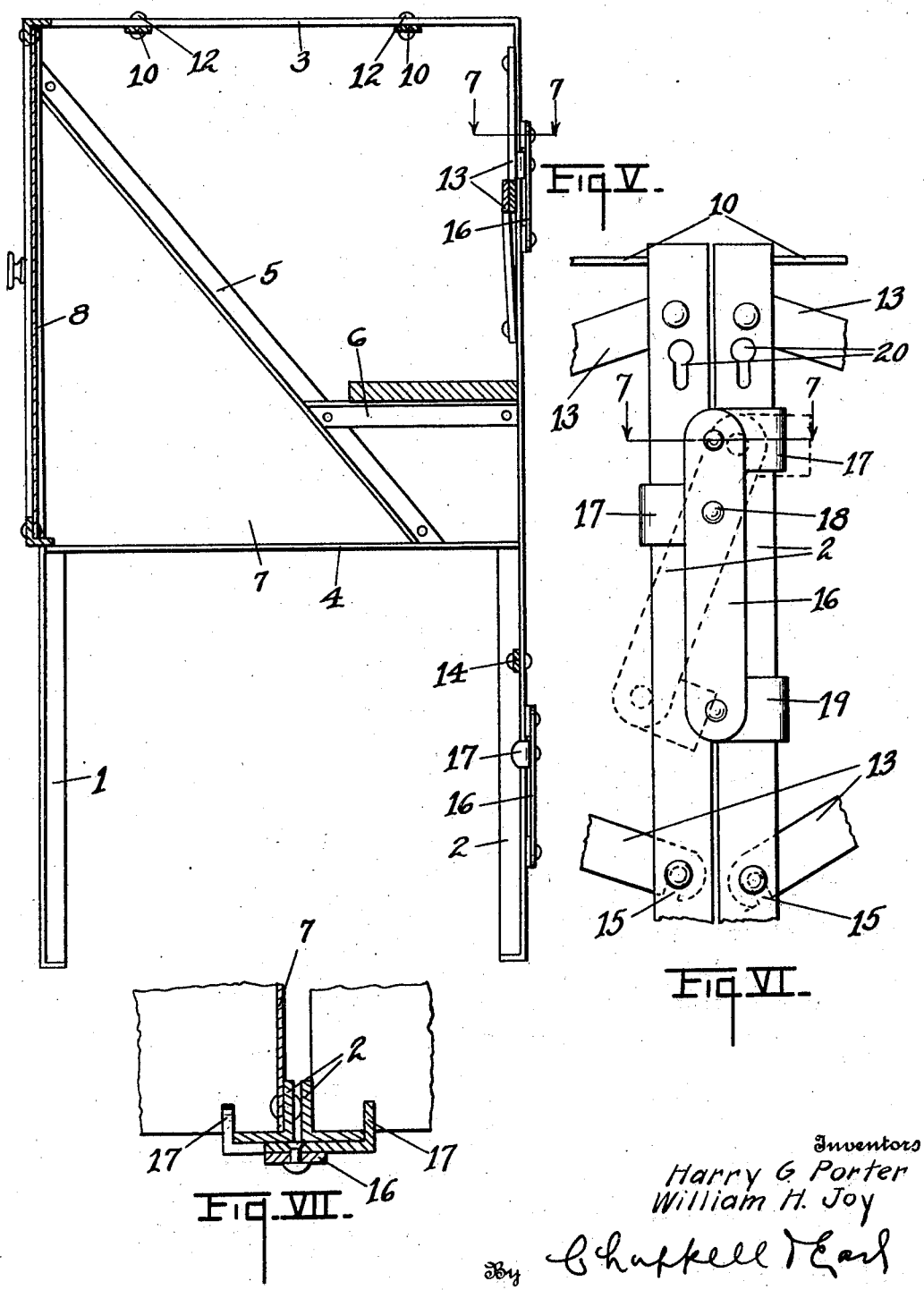

UNITED STATES PATENT OFFICE.

WILLIAM H. JOY AND HARRY G. PORTER, OF LANSING, MICHIGAN.

KNOCKDOWN VOTING-BOOTH.

1,393,224.      Specification of Letters Patent.      Patented Oct. 11, 1921.

Application filed June 9, 1921. Serial No. 476,207.

*To all whom it may concern:*

Be it known that we, WILLIAM H. JOY and HARRY G. PORTER, citizens of the United States, residing at Lansing, county of Ingham, State of Michigan, have invented certain new and useful Improvements in Knockdown Voting - Booths, of which the following is a specification.

This invention relates to improvements in knockdown voting booths.

The main objects of our invention are:

First, to provide an improved knockdown voting booth which may be formed of metal of comparatively light weight and which, when erected, is very rigid and secure.

Second, to provide an improved knockdown voting booth which, when in the knockdown is very compact and at the same time may be quickly and easily set up or collapsed.

Further objects relating to structural details, will definitely appear from the detailed description to follow.

We accomplish the objects of our invention by the devices and means described in the following specification. The invention is clearly defined and pointed out in the claims.

A structure which is a preferred embodiment of our invention is clearly illustrated in the accompanying drawing, forming a part of this application, in which:

Figure I is a perspective view of a plurality of our improved voting booth units in the knockdown.

Fig. II is a front perspective view of a series of three of the units, the door of one of the units being partially open.

Fig. III is a front perspective view of a series of three units set up as individual units and prior to their being secured together.

Fig. IV is a plan view of one of the units.

Fig. V is a vertical section on a line corresponding to line 5—5 of Fig. IV.

Fig. VI is an enlarged detail rear elevation showing structural details and means for coupling the units in a series.

Fig. VII is a detail section on a line corresponding to line 7—7 of Figs. V and VI.

Fig. VIII is an enlarged detail showing the means for detachably securing the tie bars of the unit side members.

In the drawing similar reference characters refer to similar parts throughout the several views, and the sectional views are taken looking in the direction of the little arrows at the ends of the section lines.

Referring to the drawing, we provide a plurality of units adapted to be disposed side by side, each unit comprising a pair of side members consisting of front and rear corner uprights 1 and 2, respectively, connected by top cross pieces 3, bottom cross pieces 4, diagonally disposed braces 5 extending from the front uprights to the bottom cross pieces and the shelf ledges 6 extending from the braces to the rear uprights. These parts are preferably all of angle iron and the side members are very rigid even when made of comparatively light material.

In practice, at least every other unit is provided with side panels 7 constituting partitions between adjacent units, that is, the intermediate units may be skeletons and if desired may be provided only with doors. Each unit is provided with a door 8 hinged to one of its corner uprights at 9 to close against the other. These doors are preferably adapted to collapse against the side member to which they are hinged although the hinges may, if desired, be detachable.

The side members are detachably connected by means of the top cross bars 10 connected to one side member by pivots 11 and detachably engaged with the bolts 12 on the top bar of the other side member of the unit. Similar tie bars 13 and 14 are provided at the rear, the tie bars 13 being crossed, while the tie bar 14 is horizontally disposed.

In Figs. VI and VIII we show the slots 15 in the tie bars whereby their engagement and disengagement is facilitated. The top cross bars 10 are provided with slots 15 to engage the bolts 12, as is shown, for the bars 13, in Fig. VIII.

The units are secured with their rear uprights side by side by special clamps consisting of clamping bars 16 having oppositely disposed clamping hooks 17 near one end, the pivots 18 for these hooks being spaced apart longitudinally of the clamping bar so that when the hooks are engaged and the clamping bar is swung to alinement with the uprights clamping stress is secured. The clamping bar is provided with a retaining hook 19 at its swinging end adapted to be engaged over the upright as shown in Figs. VI and VII. This clamping means may be very quickly engaged and disengaged and at the same time it connects the units very securely.

A pair of the clamping devices is provided for coupling each pair of adjacent uprights.

We have not illustrated rear panels but, where desired, these may be hung upon the rear uprights, a satisfactory means being to provide the panels with studs adapted to engage the key-hole slots 20. The panels are not illustrated as the structure thereof will be readily understood.

Having thus described our invention, what we claim as new and desire to secure by Letters Patent, is:

1. In a knockdown voting booth structure, the combination of a plurality of units adapted to be disposed side by side, each unit comprising a pair of side members each consisting of corner uprights connected by top and bottom cross pieces and diagonally disposed braces extending from the front upright to the bottom cross piece, and shelf ledges extending from the rear upright to said braces, at least every other unit being provided with wall panels constituting partitions between adjacent units, a top tie bar pivotally mounted on the top cross bar of one of said unit side members and detachably connected to the top cross bar of the other side member, a rear tie bar pivotally mounted on the rear upright of one side member of each unit and detachably connected to the rear upright of the other side member of the unit, doors hinged to the front upright of one side member of each unit to close against the front upright of the other side member and adapted to collapse against the side member to which it is hinged, and clamping members for securing the rear uprights of adjacent units together.

2. In a knockdown voting booth structure, the combination of a plurality of units adapted to be disposed side by side, each unit comprising a pair of side members each consisting of corner uprights connected by crosspieces, a top tie bar pivotally mounted on the top cross bar of one of said unit side members and detachably connected to the top cross bar of the other side member, a rear tie bar pivotally mounted on the rear upright of one side member of each unit and detachably connected to the rear upright of the other side member of the unit, doors hinged to the front upright of one side member of each unit to close against the front upright of the other side member and adapted to collapse against the side member to which it is hinged, and clamping members for securing the rear uprights of adjacent units together.

3. In a knockdown voting booth structure, the combination of a plurality of units adapted to be disposed side by side, each unit comprising a pair of side members each consisting of corner uprights connected by top and bottom cross pieces and diagonally disposed braces extending from the front upright to the bottom cross piece, and shelf ledges extending from the rear upright to said braces, at least every other unit being provided with wall panels constituting partitions between adjacent units, a top tie bar pivotally mounted on the top cross bar of one of said unit side members and detachably connected to the top cross bar of the other side member, a rear tie bar pivotally mounted on the rear upright of one side member of each unit and detachably connected to the rear upright of the other side member of the unit, and clamping members for securing the rear uprights of adjacent units together.

4. In a knockdown voting booth structure, the combination of a plurality of units adapted to be disposed side by side, each unit comprising a pair of side members each consisting of corner uprights connected by cross pieces, a top tie bar pivotally mounted on the top cross bar of one of said unit side members and detachably connected to the top cross bar of the other side member, a rear tie bar pivotally mounted on the rear upright of one side member of each unit and detachably connected to the rear upright of the other side member of the unit, and clamping members for securing the rear uprights of adjacent units together.

5. In a knockdown voting booth structure, the combination of a plurality of units adapted to be disposed side by side, each unit comprising a pair of side members each consisting of corner uprights connected by top and bottom cross pieces and diagonally disposed braces extending from the front upright to the bottom cross pieces, and shelf ledges extending from the rear upright to said braces, at least every other unit being provided with wall panels constituting partitions between adjacent units, doors hinged to the front upright of one side member of each unit to close against the front upright of the other side member and adapted to collapse against the side member to which it is hinged, and clamping members for securing the rear uprights of adjacent units together.

6. In a knockdown voting booth structure, the combination of a plurality of units adapted to be disposed side by side, each unit comprising a pair of side members each consisting of corner uprights connected by top and bottom cross pieces, and diagonally disposed braces extending from the front upright to the bottom cross pieces, and shelf ledges extending from the rear upright to said braces, at least every other unit being provided with wall panels constituting partitions between adjacent units, and clamping members for securing the rear uprights of adjacent units together.

7. In a knockdown voting booth structure, the combination of a unit comprising a pair of side members each consisting of corner uprights connected by top and bottom cross pieces and diagonally disposed braces extending from the front uprights to the bottom cross pieces, and shelf ledges extending from the rear upright to said braces, a top tie bar pivotally mounted on the top cross bar of one of said unit side members and detachably connected to the top cross bar of the other side member, a rear tie bar pivotally mounted on the rear upright of one of said side members and detachably connected to the rear upright of the other side member, and doors hinged to the front upright of one side member to close against the front upright of the other side member.

8. In a knockdown voting booth structure, the combination of a plurality of units adapted to be disposed side by side, each unit comprising a pair of side members each consisting of corner uprights, at least one side member of each unit being provided with a wall panel constituting a partition between adjacent units, means for detachably securing the side members together, and means for clamping the units together with their rear uprights disposed side by side consisting of a clamping bar having a pair of oppositely disposed clamping hooks pivoted to said clamping bar near one end with their pivots disposed in spaced relation, and a retaining hook pivoted at the other end of said bar whereby the clamping hooks may be engaged over the edges of the uprights and the clamping bar swung into alinement therewith and its retaining hook engaged.

In witness whereof, we have hereunto set our hands and seals in the presence of two witnesses.

WILLIAM H. JOY. [L. S.]
HARRY G. PORTER. [L. S.]

Witnesses:
F. A. COUCHOIS,
E. F. COUCHOIS.